March 29, 1932. R. W. ROSS ET AL 1,851,406
DUSTING MACHINE
Filed May 5, 1930
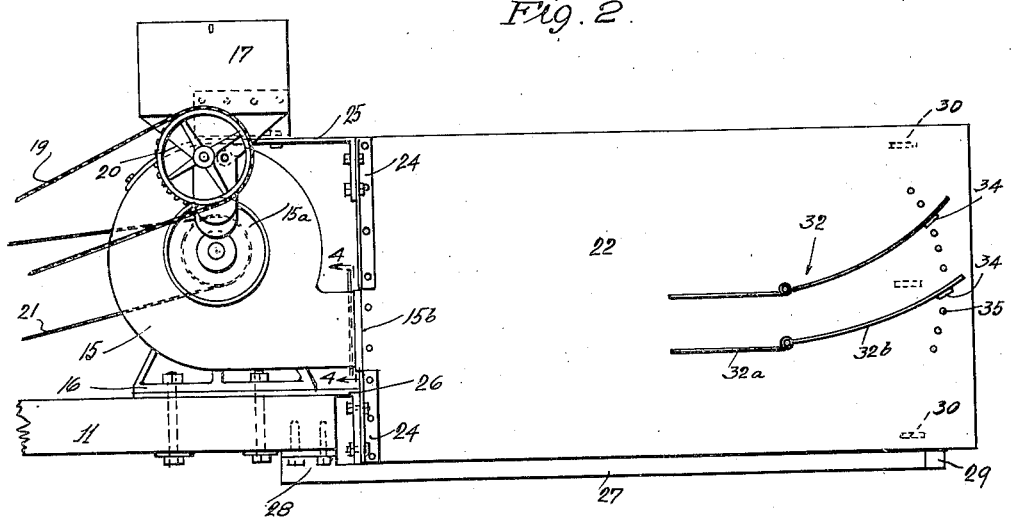
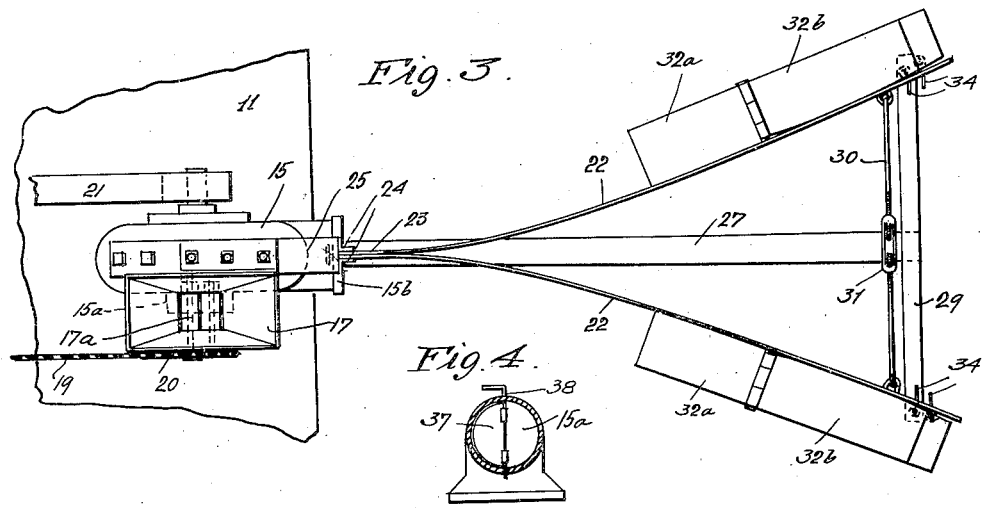
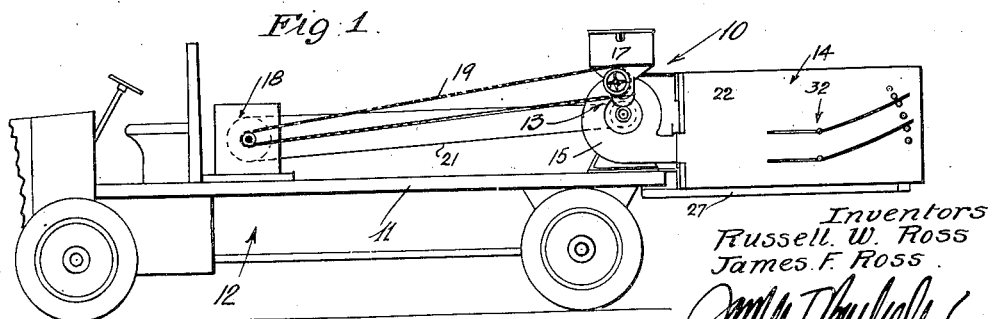
Inventors
Russell W. Ross
James F. Ross
Attorney Patented Mar. 29, 1932

1,851,406

UNITED STATES PATENT OFFICE

RUSSELL W. ROSS AND JAMES F. ROSS, OF PORTERVILLE, CALIFORNIA

DUSTING MACHINE

Application filed May 5, 1930. Serial No. 449,813.

This invention has to do with devices for applying pulverulent insecticides to orchard trees and the like, and has particular reference to a portable dusting machine adapted to discharge a stream of dust laden air into the atmosphere of the trees in a manner such that the dust is effectively applied to all parts of the trees.

The present machine may be employed for applying all kinds of pulverulent insecticides of dust-like consistency, and since the invention is independent of the particular composition or chemical nature of the insecticide material, the latter hereinafter will be referred to, in view of its fine consistency, as the "dust".

It is a general object of the invention to provide a machine of simple construction, whereby the dust may be applied effectively and intimately to all parts of the trees, including not only the upper surfaces of the leaves and branches upon which the dust may settle, but also the undersides thereof as well. We accomplish this object by a machine embodying a suitable means for forming and projecting into the atmosphere a stream of dust laden air, in combination with a baffle arrangement whereby the stream is deflected from its normal path of projection in such directions as to be most effectively dispersed into the atmosphere surrounding the trees, forming a cloud of dust.

In accordance with our present and preferred practice, we mount an air blower to which the dust is fed, on a truck in such a manner that during operations, as the truck is driven through the orchard between the rows of trees, the blower projects a stream of dust laden air rearwardly of the truck. In order to deflect the dust carrying stream into the atmosphere of the trees at both sides of the truck, we mount a deflector assembly on the truck at the rear of the blower, the particular characteristics of the deflector being such that the dust stream is deflected and directed toward the trees so as to cause the dust to be effectively and thoroughly deposited thereon in the manner hereinabove mentioned.

For the purpose of describing our invention we shall refer to the accompanying drawings which represent a typical and preferred form of dusting machine constructed in accordance with the invention. It will be understood that the invention is not to be considered as impliedly limited to the particular details of the illustrated embodiment, and that it is to be given the broader interpretation as expressed in the appended claims. In the following description, reference is had to the drawings, in which:

Figure 1 is a general side view showing the dusting machine carried at the rear of a truck;

Fig. 2 is an enlarged detailed side elevation of the blower and baffle assembly as viewed in Fig. 1;

Fig. 3 is a plan view of Fig. 2; and

Fig. 4 is a section taken through the blower outlet as indicated on line 4—4 of Fig. 2.

In Figure 1 of the drawings, the dusting machine generally indicated at 10 is shown to be mounted on the rear of the bed 11 of a suitable truck 12. The dusting machine may be characterized generally as comprising a suitable mechanism 13 for forming and projecting horizontally and rearwardly of a truck a stream of dust laden air, and a deflector assembly 14 whereby the dust stream is divided and dispersed laterally into the atmosphere at opposite sides of the truck. It will be understood that any suitable blower mechanism may be employed for so forming and projecting a dust laden stream, and also that in the broad aspects of the invention, any suitable deflector assembly may be employed which will direct and disperse the dust stream in the manner described. The particular construction illustrated, however, represents what may be considered as our preferred form of the invention because of the simplicity of the construction and effectiveness of operation, all of which will be fully explained.

The mechanism 13 for forming and projecting the dust laden stream comprises a rotary blower 15 mounted at 16 on the rear of bed 11, dust being fed to the blower intake 15a from a hopper 17 mounted on the side thereof. The rate of feed of dust to the blower may be regulated by suitable means, such as rolls 17a at the base of the hopper driven from an auxiliary engine 18 (or any other source of power), carried forwardly on the truck bed, by way of chain 19 and sprocket 20. The blower 15 also may be driven from the auxiliary engine 18 by way of belt 21. During operation the dust from hopper 17 is fed into the blower 15, and a dust laden stream of air is projected by the blower through outlet 15b rearwardly of the truck, and in a substantially horizontal path.

Mounted at the rear of the blower is a substantially V-shaped deflector comprising a pair of vertically extending and diverging vanes 22 which are brought together at their forward ends as at 23. The vanes are held together at 23 between vertical angle irons 24 at opposite sides of the vanes, and the vane assembly is supported from the blower and the truck bed by straps 25 and 26 bolted to the upper and lower extents of angle irons 24. We have shown as an additional support for the vanes, a tongue 27 joined at 28 to the under side of the truck bed 11, and having a T-arm 29 at its rear end and upon which the outer ends of the vanes 22 rest.

The vanes are positioned relative to the blower so that their forward edges bisect the outlet opening 15b, see Fig. 4, thereby causing the stream discharged through the outlet against the apex of the V-shaped deflector, to be divided and to be deflected laterally by the vanes into the atmosphere at opposite sides of the truck. Angle irons 24 are shown to be cut away opposite the outlet in order to obviate undue restriction to the stream discharged from the blower.

In order to provide for varying the angle at which the dust laden stream is deflected by the vanes 22, means is provided for adjustably varying their angle of divergence. Vanes 22 are made of suitable flexible sheet metal and are held spread apart at their outer ends by means of one or more sets of rods 30, three being shown as typical (see Fig. 2), joined together by a turn-buckle 31, which may be adjusted so as to vary the spread of the vanes, as will be readily understood. It is preferred that the vanes have flexible characteristics, instead, for instance of being rigid and hinged together at 23 so as to permit their being adjusted as described, in order to present a curved stream line contour which will be of greatest effectiveness in causing the stream to be deflected or projected laterally to the extent required for the dust particles to be dispersed into the atmosphere surrounding the trees.

Mounted on the sides of vanes 22 is a plurality of vertically inclined laterally projecting vanes, generally indicated at 32, of which there may be any suitable number, and which may be shaped in any suitable manner so as to direct at least a portion of the stream discharged from the blower upwardly into the atmosphere. Vanes 32 are formed in sections 32a and 32b, the former of which are welded to the sides of vanes 22 and extend horizontally and substantially in line with the blower outlet 15b. Preferably vanes 32a will be spaced from the outlet in about the proportions shown in order that the stream discharged from the blower will have become spread somewhat before being directed against the vanes. Vane sections 32b preferably having an upward curvature, are hinged to the outer ends of sections 32a and are supported on pins 34 inserted within holes 35 drilled in vanes 22, sections 32b, thus being adjustable to vary their inclination, by changing the positions of pins 34 in holes 35. A portion of the dust laden stream projected from the blower against baffles 32 is directed upwardly into the atmosphere, while at the same time being deflected laterally by vanes 22 as described. Another portion of the stream, and which may be comparatively small, is directed beneath the lowermost vanes 32 and is caused to follow an upward path beneath the inclined portions 32b of the lower vanes, in accordance with the slope of the latter. It is evident that any number of vanes 32 may be used and that dust laden stream will be divided into a corresponding number of portions which will be deflected upwardly in various directions depending upon the several inclinations of the individual vanes.

It will be noted that the blower projected stream is thus deflected laterally into the atmosphere at opposite sides of the truck, and is also caused to follow a more or less sweeping upward path due to the effect of the vertically inclined vanes, thereby causing the dust particles to be directed upwardly within the atmosphere surrounding the trees to the end that the dust is caused to deposit on the under sides of the leaves and branches, as well as to settle on the upper surfaces thereof.

As previously mentioned, during operations the truck is driven between the rows of orchard trees with the blower continuously expelling a dust laden air stream rearwardly of the truck. By the dispersing effect of the baffle assembly on the dust carrying stream, dust particles in the latter are effectively deposited upon the trees at both sides of the truck. If for any reason it should be desired to dust the trees only at one side of the truck, as might be the case were the truck to be driven along the border of the orchard, the delivery of dust from the blower to the outside of one of the vanes 22 may be cut off by providing a suitable barrier in the blower outlet 15*b*. As typical there is shown in Fig. 4 a damper 37 adjustably mounted on the vertical rod 38 alined with the forward edges of the vanes 22. Normally damper 37 will be fastened in an unobstructing position parallel with the edge of the vanes, but should it be desired to close off one side or the other of the outlet, the damper may be turned accordingly.

It will be understood the drawings and description are to be considered merely as illustrative of and not restrictive on the broader claims appended hereto, for various changes in design, structure and arrangement may be made without departing from the spirit and scope of said claims.

We claim:

1. In a dusting machine, the combination comprising, means for forming and projecting a stream of dust laden air, a pair of deflector vanes disposed in the path of said stream and arranged at different angles relative thereto, said vanes being adapted to deflect the stream from its projected path in different directions into the atmosphere, and a second pair of deflector vanes disposed in the path of said stream and at right angles to the first mentioned vanes, the second mentioned vanes being adapted to deflect the stream from its projected path in a plane perpendicular to the deflections caused by the first mentioned vanes.

2. In a dusting machine, the combination comprising, means for forming and projecting a stream of dust laden air, a vertically extending deflector disposed in the path of said stream and arranged at an angle relative thereto, and a vertically inclined deflector mounted at the side of the first mentioned deflector, said deflectors being adapted to deflect the stream horizontally and upwardly from its normal projected path to disperse the dust particles into the atmosphere.

3. In a dusting machine, the combination comprising, means for forming and projecting a stream of dust laden air, a substantially V-shaped deflector comprising a pair of vertically extending and horizontally flexible vanes arranged in the path of said stream, said stream being directed against the apex of said deflector and thereby divided and dispersed horizontally in different directions into the atmosphere, and means for adjusting the angle of divergence of said vanes.

4. In a dusting machine, the combination comprising, means for forming and projecting a stream of dust laden air, a substantially V-shaped deflector comprising a pair of vertically extending and horizontally diverging vanes arranged in the path of said stream, and a pair of vertically inclined deflector vanes mounted on the opposite outer sides of said first mentioned vanes.

5. In a dusting machine, the combination comprising, means for forming and projecting a stream of dust laden air, a substantially V-shaped deflector comprising a pair of vertically extending and horizontally diverging vanes arranged in the path of said stream, a pair of vertically inclined deflector vanes mounted on the opposite outer sides of said first mentioned vanes, and means for adjusting the vertical inclination of the last mentioned vanes.

6. In a device of the character described, the combination comprising, a truck, an air blower mounted on said truck, means for feeding dust to the blower, said blower being adapted to discharge a stream of dust laden air rearwardly of the truck, a vertically extending and substantially V-shaped deflector mounted on said truck at the rear of said blower in the path of said stream and vertically inclined vanes on said deflector, said deflector and vanes being arranged so as to divide and deflect the stream into the atmosphere at opposite sides of the truck.

7. In a device of the character described, the combination comprising a truck, an air blower mounted on said truck, means for feeding dust to the blower, said blower being adapted to discharge a stream of dust laden air rearwardly of the truck, a substantially V-shaped deflector mounted on said truck at the rear of said blower in the path of said stream and arranged so as to divide and deflect the stream into the atmosphere at opposite sides of the truck, said deflector being openly exposed to the atmosphere, and means for selectively directing the stream exclusively against one side of the deflector to discharge the stream at one side only of the truck.

8. In a dusting machine, the combination comprising means for forming and projecting a stream of dust laden air, a substantially V-shaped deflector comprising a pair of vertically extending and horizontally diverging vanes arranged in the path of said stream, said deflector being openly exposed to the atmosphere, a vertically inclined deflector vane mounted on each of the opposite outer sides of said first mentioned vanes, and means to adjust the angle of divergence of the horizontally diverging vanes.

9. In a dusting machine, the combination comprising means for forming and projecting a stream of dust laden air, a substantially V-shaped deflector comprising a pair of vertically extending and horizontally diverging vanes arranged in the path of said stream, a plurality of vertically inclined deflector vanes mounted on each of the opposite outer sides of said first mentioned vanes, and means for adjusting the vertical inclination of each of the last mentioned vanes, whereby said stream is divided and the several portions deflected upwardly at different angles.

10. In a dusting machine, the combination comprising, means for forming and projecting a stream of dust laden air, and a substantially V-shaped deflector comprising a pair of vertically extending and horizontally diverging vanes arranged in the path of said stream, said stream being directed against the apex of said deflector and thereby divided and dispersed horizontally in different directions into the atmosphere, and an extensible member connected at its ends to said vanes and adapted to move the vanes toward or away from each other to change the divergence of the vanes.

11. In a device of the character described, the combination comprising a truck, an air blower mounted on said truck, means for feeding dust to the blower, said blower being adapted to discharge through an orifice a stream of dust laden air rearwardly of the truck, and a substantially V-shaped deflector mounted on said truck at the rear of said blower in the path of said stream and arranged so as to divide and deflect the stream into the atmosphere at opposite sides of the truck, said deflector being openly exposed to the atmosphere at its top and sides so that the air stream may freely expand upwardly and sidewardly after discharge from the orifice, and said deflector having a vertical dimension substantially greater than the orifice so that the stream may be deflected as it expands.

In witness that we claim the foregoing we have hereunto subscribed our names this 18th day of April, 1930.

RUSSELL W. ROSS.
JAMES F. ROSS.